June 24, 1952 M. C. FISHER 2,601,603
MECHANISM FOR ASSEMBLING ANNULAR MEMBERS
Filed Dec. 22, 1945 2 SHEETS—SHEET 1

INVENTOR.
MARCUS C. FISHER
BY
T. J. Plante
ATTORNEY

June 24, 1952  M. C. FISHER  2,601,603
MECHANISM FOR ASSEMBLING ANNULAR MEMBERS
Filed Dec. 22, 1945  2 SHEETS—SHEET 2
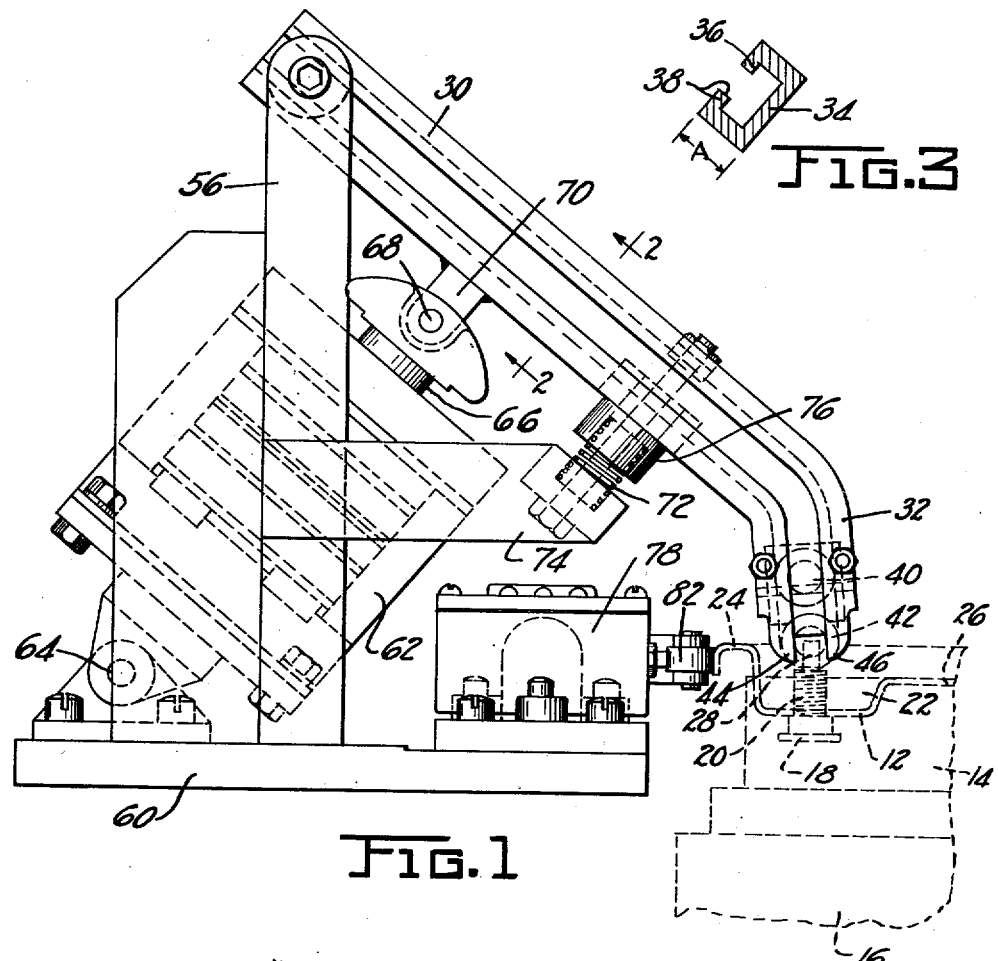
INVENTOR.
MARCUS C. FISHER
BY
T. J. Plante
ATTORNEY Patented June 24, 1952

2,601,603

UNITED STATES PATENT OFFICE 2,601,603

MECHANISM FOR ASSEMBLING ANNULAR MEMBERS

Marcus C. Fisher, South Bend, Ind., assignor to Bendix Aviation Corporation, South Bend, Ind., a corporation of Delaware Application December 22, 1945, Serial No. 637,039

6 Claims. (Cl. 10—162)

1

This invention pertains to mechanism for assembling annular members, such as washers or nuts or the like, upon cylindrical members, such as bolts or posts.

The primary object of the invention is to provide automatically operating mechanical means for placing such annular members in position upon the cooperating cylindrical members, thereby avoiding the necessity of performing this operation by hand.

The principles of the present invention are capable of a very wide application to production line problems. However, the illustrated form of the invention is concerned with the assembling of anchor bolts upon the backing plates of brakes. In certain types of brake, it is customary to pivot the brake shoes upon bolts which are secured to the brake backing plate. The threaded portion of the bolt extends through an opening in the backing plate and is secured in position by a nut screwed on from the side of the backing plate remote from the shoes. Usually there are two such anchor bolts in each brake assembly, and heretofore two separate hand operations have been necessary merely to place the nuts in position upon the bolts preparatory to turning them down. Furthermore, since it is customary to provide a washer for each nut and bolt combination, a brake having two anchor bolts requires two hand operations to place the washers in position prior to assembling the nuts.

The present invention makes it possible to assemble both the washers and the nuts mechanically, and thereby substantially reduce both the cost and the time required for assembling the brake.

Other objects and advantages of the present invention will become apparent during the course of the following description, reference being had therein to the accompanying drawings, in which:

Figure 1 is a side elevation showing the automatically operating mechanism for assembling annular members, which is the subject matter of the present application;

Figure 2 is a cross-sectional view of the chute of Figure 1, said view being taken on the line 2—2 of Figure 1;

Figure 3 is a cross-sectional view showing the dimensions of the chute if the elements to be assembled are nuts, instead of the washers for which the chute illustrated in Figure 2 is provided;

2

Figure 4:
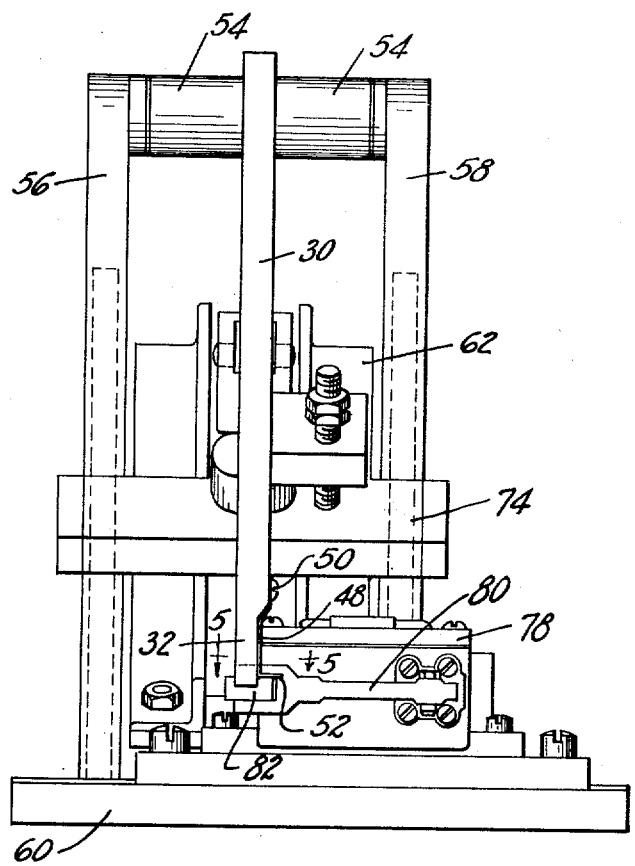
Figure 4 is a front elevation of the mechanism of Figure 1.
Figure 5:
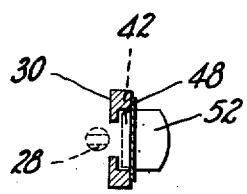

Figure 5 is a cross-sectional view taken on the line 5—5 of Figure 4; and

Figure 6:
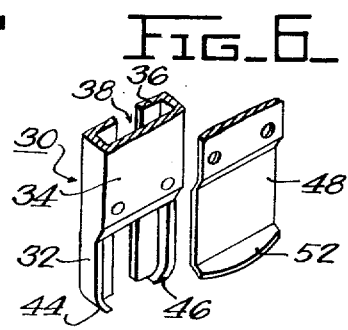

Figure 6 is an exploded view of the relation between the spring member and the lower end of the chute.

In Figure 1, a backing plate 12 of a brake assembly is illustrated in dotted lines, in order to show more clearly the manner of operation of the assembling machine. The backing plate 12 is set in a holder 14, which in turn is carried by a suitable horizontally moving conveyor 16. An anchor bolt 18 is shown mounted upon the backing plate 12, said anchor bolt having a threaded portion 20 extending through an opening in the backing plate into a depression 22 formed in the outside of said plate. The peripheral portion 24 of the backing plate is located somewhat farther out than the body portion 26 of the plate, in order to enclose the edge of the brake drum, in accordance with the usual arrangement. Beyond the threaded portion 20, the anchor bolt is provided with an integral pilot extension 28, the purpose of which will be more fully explained hereinafter.

A chute 30 is arranged to deliver the annular members which are to be assembled to the location from which they are moved onto the advancing, erect anchor bolts. The chute 30 receives the annular members, such as the washers or nuts, from a suitable hopper (not shown), which may be constructed to automatically deliver the annular members into the upper end of the chute, whence they move under the influence of gravity downwardly toward the lower or delivery end 32 of the chute. The annular members are so positioned in the chute that they lie in a plane normal to the line of travel of the backing plate 12 and anchor bolt 18. In the illustrated embodiment of the invention, the dimensions of the chute 30 are such as to accommodate washers, the cross section of the chute being shown in Figure 2. Figure 3 illustrates the cross section of a chute which is capable of handling nuts, the thickness of the nuts being somewhat greater than the thickness of the washers. In the actual assembly line set up, one machine will be provided to assemble the washers on the anchor bolts, and a second machine will be provided to assemble the nuts, after the washers have been placed in position.

The chutes illustrated in cross section in Figures 2 or 3 are identical except for the dimension A. Each chute has a closed side 34 and, opposite thereto, a side 36 having a longitudinal slot 38 provided therein. The slot 38 could be dispensed with in the upper portion of the chute, but it has the advantage that it enables an observer to ascertain whether the chute is properly filled with washers or nuts, as the case may be. The width of slot 38 is of course less than the width of the annular members, two such members 40 and 42 being illustrated in dotted lines at the lower end of the chute in order to more fully illustrate the manner of operation of the mechanism. The lower end of the chute has curved jaws 44 and 46 which support the lowermost washer 42, and thus prevent it from dropping vertically out of the chute. As illustrated, jaws 44 and 46 only extend to the edges of slot 38, thereby leaving sufficient space through which the pilot extension 28 of the anchor bolt can pass.

As shown in Figures 4 and 5, the lower end 32 of chute 30 is reduced in width and the side farthest from the advancing pilot extension 28 is left open except for a leaf spring 48 which is secured to the side of the chute by one or more screws 50 and which has its lower end extending across the open side of the chute. The lower end of leaf spring 48 normally retains the washers 42 in position inside the lower end of the chute. However, when the oncoming pilot extension 28 contacts the lower edge of washer 42, the force exerted by the pilot extension is sufficient to bend leaf spring 48 away from the open side of the chute, the washer 42 temporarily pivoting on its upper edge as it gradually moves from the vertical plane in which it is originally positioned to a horizontal plane in which it slips down onto the anchor bolt 18.

As shown in Figure 1, the pilot extension 28 extends upwardly beyond the lower side of the annular washer 42, but does not extend far enough to contact the upper side of the washer. Thus, as the washer moves from the vertical to the horizontal position, it rings the pilot extension, and is guided into position by said extension, which projects through the open center portion of the washer. Preferably a wiper 52 extends to the right of the lower end of chute (as seen in Figure 4) to assist in guiding the washer onto the pilot extension 28 of the anchor bolt. The wiper 52 may conveniently be formed, as shown, as an arm integral with the leaf spring 48 and preferably the arm 52 has a slight downward slant in order that the flattening out of the position of the washer may be accomplished gradually.

Once the washer 42 has been assembled on the anchor bolt 18, and moved out of engagement with leaf spring 48, the spring snaps back to its original position, and the next washer 40 descends to the bottom of the chute, ready to be picked up by the next anchor bolt.

It will be noted that the height of the peripheral portion 24 of backing plate 12 is such as to engage the lower end of the chute, unless provision is made to move the chute out of the interfering zone. This is accomplished by mounting the chute for pivotal movement on the cross arms 54 which are supported in the standards 56 and 58, said standards in turn being supported on the base 60. A solenoid motor 62, the casing of which is pivotally supported at 64 on the base 60, is arranged to control movements of chute 30. The armature of the solenoid has a portion 66 extending upwardly therefrom and connected by means of a pin 68 to a thrust member 70 which is welded to the lower side of the chute. The solenoid motor 62 is arranged when energized to draw the chute 30 downwardly into the position shown in the drawings. Upon deenergization of the solenoid a compression spring 72 urges the chute upwardly, away from the interfering zone. The lower end of spring 72 is supported in a depression provided in the front end of a horizontal member 74 which is upheld by the standards 56 and 58. The upper end of spring 72 acts through a cup-shaped member 76 against the lower side of the chute.

Solenoid motor 62 is under the control of an electric switch 78, the wiring connections between the switch and solenoid not being shown. The switch 78, which may be of any suitable conventional construction, is operated by an arm 80 which is adapted to swing in a horizontal plane. A roller 82 supported on the end of arm 80 is engaged by the outer peripheral portion 24 of the backing plate 12 after the first interfering edge of the backing plate has passed the chute. The arm 80 is thus swung toward the casing of the switch, causing the switch to close the solenoid circuit and energize the solenoid. Energization of the solenoid draws the chute 30 downwardly into the operating position shown in Figures 1 and 4. As soon as the backing plate 12 has passed sufficiently far to release the arm 80, switch 78 is automatically moved to open position, and the solenoid motor 62 is deenergized. This permits spring 72 to raise chute 30 and thus allow the oncoming edge of backing plate 12 to pass the lower end of the chute.

As explained above, a similar machine then places a nut in position upon the anchor bolt 18. In this instance, the chute 30 will have the dimensions illustrated in Figure 3 to accommodate the greater thickness of the nut. The brake backing plate assembly is then ready to have a power driven wrench turn down the nut into tight engagement with the washer and backing plate.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. Automatically operable means for assembling an annular member upon a projecting member supported on a structure which is in the process of being assembled comprising means for moving said structure in a substantially horizontal plane, a chute above said plane having a passage in which said annular member is caused to feed toward the projecting member, said chute as a whole being movable to shift the lower end thereof toward or away from the aforesaid structure and its projecting member, electrically operated means for moving said chute toward said structure-moving means, biasing means yieldably urging said chute away from said structure-moving means, and switch means controlling said electrically operated means and so positioned as to be operated by contact with a portion of the aforesaid structure as it passes by.

2. Automatically operable means for assembling an annular member, such as a nut or the like, upon an erect member, such as a bolt or the like, comprising means for moving an erect member in a substantially horizontal plane, a chute above said plane having a passage inclined downwardly lying in a plane transverse to the direction of approach of said means, the lower end of said chute being partially closed, the upper portion of the chute being pivotally mounted upon a supporting member to permit movement of the lower end of the chute toward and away from said means, a spring urging the chute away from said means, a solenoid motor arranged when energized to overcome the spring and move the chute toward said means, a normally open switch controlling the solenoid motor, a member adapted to close the switch to thereby cause the lower end of the chute to move into position over said means, the side of said chute which faces the direction of approach of said means having at its lower end a longitudinal slot, the other side of said chute being constituted at its lower end by a spring member which yieldably retains the annular member in the chute, and a wiping member on said spring member having a surface slightly inclined from the horizontal and located just behind the chute.

3. Automatically operable means for assembling a washer or nut or the like upon a projecting member supported on a structure which is in the process of being assembled comprising structure conveyor means movable in a substantially horizontal plane, a chute above said plane having a passage adapted to slidably receive washers or the like and positioned with its lower end over said conveyor means, said passage lying in a plane transverse to the line of transport of said conveyor means, the lower end of said chute being at least partially closed to prevent the nut or washer from dropping vertically out of the chute, said chute as a whole being movable to shift the lower end thereof toward or away from said conveyor means, motor means for moving said chute toward said conveyor means and into a predetermined position with respect to said conveyor means, actuating means dominating said motor means and so positioned as to be operated by operative contact with a portion of the aforesaid structure as it passes by, and biasing means yieldably urging said chute away from said conveyor means, the side of said chute which faces the direction of approach of said conveyor means having at its lower end a longitudinal slot which uncovers the open center portion of the washer or the like and the other side of said chute being constituted at its lower end by a resilient retainer which yields as a washer or the like is discharged from the chute.

4. Automatically operable means for assembling an annular member upon a projecting member supported on a structure which is in the process of being assembled comprising conveyor means movable for moving said structure in a substantially horizontal plane, a chute above said plane having a passage inclined toward said plane while lying in a plane transverse to the direction of approach of said conveyor means, the lower end of said chute being at least partially closed, said chute as a whole being movable to shift the lower end thereof toward or away from said conveyor means, electrically operated means for moving said chute toward said conveyor means, biasing means yieldably urging said chute away from said conveyor means, and switch means controlling said electrically operated means and positioned alongside said conveyor means for operation by a member thereon to move said chute into the path of said projecting member when said projecting member is in position to receive said annular member, the side of said chute which faces the approaching conveyor means having at its lower end a slot.

5. Automatically operable means for assembling a washer or nut or the like upon a projecting member supported on a structure which is in the process of being assembled comprising structure conveying means movable in a substantially horizontal plane, a chute above said plane having a portion adapted to slidably receive washers or the like and positioned with its discharge end over said conveying means, said chute being movable to shift said discharge end toward or away from said conveying means, motor means for moving said chute toward said conveying means and into a predetermined position with respect to said conveying means, actuating means dominating said motor means and being so positioned as to be operated by operative contact with a portion of the aforesaid structure as it passes by, and biasing means urging said chute away from said conveying means, the side of said discharge end which faces the direction of approach of said conveying means having an opening which uncovers the center portion of the washer or the like, and the other side of said discharge end being constituted by a retainer which yields as a washer or the like is discharged therefrom.

6. Automatically operable means for assembling a washer or nut or the like upon a projecting member supported on a structure which is in the process of being assembled comprising structure conveying means movable in a substantially horizontal plane, a chute above said plane having a portion adapted to slidably receive washers or the like and positioned with its discharge end over said conveying means, said chute being movable to shift said discharge end toward or away from said conveying means, motor means operated by a member on said conveying means for moving said chute into the path of said projecting member when said projecting member is in position to receive said washer and the like, and biasing means urging said chute away from said conveying means, the side of said discharge end which faces the direction of approach of said conveying means having an opening which uncovers the center portion of the washer or the like, and the other side of said discharge end being constituted by a retainer which yields as a washer or the like is discharged therefrom.

MARCUS C. FISHER.

REFERENCES CITED

The following references are of record in the file of this patent:

UNITED STATES PATENTS

| Number | Name | Date |
| --- | --- | --- |
| 480,530 | Tobey | Aug. 9, 1892 |
| 1,385,086 | Maranville | July 19, 1921 |
| 1,390,351 | Faessel | Sept. 13, 1921 |
| 1,429,359 | Maranville | Sept. 19, 1922 |
| 1,737,876 | Crosby | Dec. 3, 1929 |
| 1,822,099 | Kmentt | Sept. 8, 1931 |
| 1,990,148 | Tevander | Feb. 5, 1935 |
| 2,119,617 | Winkley | June 7, 1938 |
| 2,248,183 | Mulvany | July 8, 1941 |
| 2,353,200 | Sundell | July 11, 1944 |